(12) United States Patent
Lu et al.

(10) Patent No.: US 12,512,095 B2
(45) Date of Patent: Dec. 30, 2025

(54) UNSUPERVISED DATA SELECTION VIA DISCRETE SPEECH REPRESENTATION FOR AUTOMATIC SPEECH RECOGNITION

(71) Applicant: Google LLC, Mountain View, CA (US)

(72) Inventors: Zhiyun Lu, Brooklyn, NY (US); Yu Zhang, Mountain View, CA (US); Wei Han, Redwood City, CA (US); Yongqiang Wang, Kirkland, WA (US); Parisa Haghani, Mountain View, CA (US); Zhehuai Chen, Edgewater, NJ (US)

(73) Assignee: Google LLC, Mountain View, CA (US)

( * ) Notice: Subject to any disclaimer, the term of this patent is extended or adjusted under 35 U.S.C. 154(b) by 283 days.

(21) Appl. No.: 18/320,458

(22) Filed: May 19, 2023

(65) Prior Publication Data
US 2024/0013777 A1  Jan. 11, 2024

Related U.S. Application Data

(60) Provisional application No. 63/368,126, filed on Jul. 11, 2022.

(51) Int. Cl.
*G10L 15/16* (2006.01)
*G10L 15/06* (2013.01)

(52) U.S. Cl.
CPC ............ *G10L 15/16* (2013.01); *G10L 15/063* (2013.01)

(58) Field of Classification Search
CPC ........ G10L 15/16; G10L 15/063; G10L 15/00
See application file for complete search history.

(56) References Cited

U.S. PATENT DOCUMENTS

| | | | | |
|---|---|---|---|---|
| 8,010,357 B2* | 8/2011 | Hakkani-Tur | ...... | G10L 15/1822 704/10 |
| 11,551,668 B1* | 1/2023 | Baevski | ............. | G06F 18/2155 |
| 2011/0119059 A1* | 5/2011 | Ljolje | ................... | G10L 15/063 704/250 |
| 2019/0147854 A1* | 5/2019 | Li | ........................ | G10L 15/065 704/256 |
| 2020/0125928 A1* | 4/2020 | Doyle | .............. | G06V 30/19147 |
| 2020/0251089 A1* | 8/2020 | Pinto | ....................... | A63F 13/54 |
| 2021/0056417 A1* | 2/2021 | Zhang | .................... | G06N 20/00 |
| 2021/0088867 A1* | 3/2021 | Nagel | ................ | G01N 21/8851 |
| 2021/0383195 A1* | 12/2021 | Gygli | ..................... | G06N 3/045 |
| 2022/0147761 A1* | 5/2022 | Tsai | ....................... | G06N 3/045 |
| 2022/0366898 A1* | 11/2022 | Qian | ....................... | G10L 15/22 |
| 2023/0040181 A1* | 2/2023 | Neelagiri | .............. | G10L 15/063 |
| 2023/0153533 A1* | 5/2023 | Mahapatra | ........... | G06F 18/214 704/9 |
| 2023/0351212 A1* | 11/2023 | Wang | ..................... | G06N 5/022 |

* cited by examiner

*Primary Examiner* — Michael Colucci
(74) *Attorney, Agent, or Firm* — Honigman LLP; Brett A. Krueger; Grant Griffith

(57) ABSTRACT

A method includes obtaining a corpus of unlabeled training data including a plurality of spoken utterances, each corresponding spoken utterance of the plurality of spoken utterances includes audio data characterizing the corresponding spoken utterance. The method also includes receiving a target domain. The method also includes selecting, using a contrastive data selection model, a subset of the utterances from the corpus of unlabeled training data that correspond to the target domain. The method includes training an automatic speech recognition (ASR) model on the subset of utterances.

18 Claims, 7 Drawing Sheets

UNSUPERVISED DATA SELECTION VIA DISCRETE SPEECH REPRESENTATION FOR AUTOMATIC SPEECH RECOGNITION

CROSS-REFERENCE TO RELATED APPLICATIONS

This U.S. patent application claims priority under 35 U.S.C. § 119(e) to U.S. Provisional Application 63/368,126, filed on Jul. 11, 2022. The disclosure of this prior application is considered part of the disclosure of this application and is hereby incorporated by reference in its entirety.

TECHNICAL FIELD

This disclosure relates to unsupervised data selection via discrete speech representation for automatic speech recognition.

BACKGROUND

Automatic speech recognition (ASR) is the computer process of transcribing an audio input of spoken language (i.e., an utterance) into text. In general, ASR models are trained on a large pool of audio data to learn how to accurately transcribe utterances. Modern ASR models continue to improve in both accuracy (e.g. a low word error rate (WER)) and latency (e.g., delay between the user speaking and the transcription) based on the ongoing development of deep neural networks. However, one challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model.

SUMMARY

One aspect of the disclosure provides a computer-implemented method that when executed on data processing hardware causes the data processing hardware to perform operations that include obtaining a corpus of unlabeled training data including a first set of spoken utterances and receiving a target domain. Here, each corresponding spoken utterance in the first set of spoken utterances includes audio data characterizing the corresponding spoken utterance. The operations also include selecting, using a contrastive data selection model, a subset of the spoken utterances from the corpus of unlabeled training data that correspond to the target domain and training an automatic speech recognition (ASR) model on the subset of spoken utterances selected from the corpus of unlabeled training data that correspond to the target domain.

Implementations of the disclosure may include one or more of the following optional features. In some implementations, training the ASR model includes training the ASR model on the subset of spoken utterances using a self-supervised training technique. In some examples, the selected subset of spoken utterances includes a fewer number spoken utterances than a number of spoken utterances in the corpus of unlabeled training data. In some implementations, the operations also include refining the ASR model by training the ASR model on labeled training data that includes a second set of spoken utterances and a respective ground-truth transcription paired with each spoken utterance in the second set of spoken utterances.

In some implementations, selecting the subset of the spoken utterances includes, for each corresponding spoken utterance in the corpus of unlabeled training data: quantizing the audio data characterizing the spoken utterance to produce a corresponding sequence of discrete tokens; generating a domain relevance score based on the corresponding sequence of discrete tokens; and determining to select or omit selection of the corresponding spoken utterance based on the domain relevance score. Here, generating the domain relevance score may include: processing, using a first language model, the corresponding sequence of discrete tokens of the corresponding spoken utterance to generate a first output; processing, using a second language model, the respective sequence of discrete tokens of the utterance to generate a second output; and comparing the first output to the second output to determine the domain relevance score. The first language model is trained on target training data corresponding to the target domain, while the second language model is trained on general training data corresponding to a plurality of domains. Optionally, the domain relevance score may be based on a difference between the first output and the second output divided by a number of tokens in the corresponding sequence of discrete tokens of the corresponding spoken utterance. In some examples, the first language model and the second language model include N-gram language models. Moreover, quantizing the spoken utterance may include mapping one or more continuous features of the audio data characterizing the spoken utterance into the sequence of discrete tokens. The contrastive data selection model may include a self-supervised learning model.

Another aspect of the present disclosure includes data processing hardware and memory hardware in communication with the data processing hardware and storing instructions that when executed on the data processing hardware causes the data processing hardware to perform operations that include obtaining a corpus of unlabeled training data including a first set of spoken utterances and receiving a target domain. Here, each corresponding spoken utterance in the first set of spoken utterances includes audio data characterizing the corresponding spoken utterance. The operations also include selecting, using a contrastive data selection model, a subset of the spoken utterances from the corpus of unlabeled training data that correspond to the target domain and training an automatic speech recognition (ASR) model on the subset of spoken utterances selected from the corpus of unlabeled training data that correspond to the target domain.

This aspect of the disclosure may include one or more of the following optional features. In some implementations, training the ASR model includes training the ASR model on the subset of spoken utterances using a self-supervised training technique. In some examples, the selected subset of spoken utterances includes a fewer number spoken utterances than a number of spoken utterances in the corpus of unlabeled training data. In some implementations, the operations also include refining the ASR model by training the ASR model on labeled training data that includes a second set of spoken utterances and a respective ground-truth transcription paired with each spoken utterance in the second set of spoken utterances.

In some implementations, selecting the subset of the spoken utterances includes, for each corresponding spoken utterance in the corpus of unlabeled training data: quantizing the audio data characterizing the spoken utterance to produce a corresponding sequence of discrete tokens; generating a domain relevance score based on the corresponding sequence of discrete tokens; and determining to select or omit selection of the corresponding spoken utterance based on the domain relevance score. Here, generating the domain relevance score may include: processing, using a first language model, the corresponding sequence of discrete tokens of the corresponding spoken utterance to generate a first output; processing, using a second language model, the respective sequence of discrete tokens of the utterance to generate a second output; and comparing the first output to the second output to determine the domain relevance score. The first language model is trained on target training data corresponding to the target domain, while the second language model is trained on general training data corresponding to a plurality of domains. Optionally, the domain relevance score may be based on a difference between the first output and the second output divided by a number of tokens in the corresponding sequence of discrete tokens of the corresponding spoken utterance. In some examples, the first language model and the second language model include N-gram language models. Moreover, quantizing the spoken utterance may include mapping one or more continuous features of the audio data characterizing the spoken utterance into the sequence of discrete tokens. The contrastive data selection model may include a self-supervised learning model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automatic speech recognition (ASR) technology has made tremendous improvements in accuracy and latency with the implementation of machine learning methods for training. ASR models are typically trained on large training data sets that include audio data of spoken language (i.e., an utterance) paired with a ground-truth transcription (i.e., a label) of the audio data. During training, the ASR model is fed an utterance to produce an output transcription. The output transcription is compared to the corresponding ground-truth transcription to determine a supervised loss in which one or more parameters of the ASR model are trained based the supervised loss, e.g., using stochastic gradient descent. This process continues for the entire set of training data to further refine the model.

The process of training a model with labeled training data is called "supervised" learning. One drawback to supervised learning is that it can be difficult to obtain enough labeled training data to train an ASR model for low resource domains and/or low resource languages. For example, a particular language may be underrepresented in a labeled training data set and any ASR model trained using that labeled training data set would produce less accurate results for users speaking in that particular language. One way to bolster training data for underrepresented domains is to use untranscribed audio data (i.e., unlabeled training data), which is easier to obtain in large quantities, to pre-train the ASR model, known as "self-supervised" training. Self-supervised pre-training of speech representations has achieved impressive results in improving ASR word error rates (WER).

Implementations herein further improve on self-supervised training of ASR models by providing a simple and flexible framework for selecting unlabeled data for pre-training. More specifically, implementations are directed toward a contrastive data selection model that processes unlabeled training data into discrete speech representations and applies contrastive data selection to generate a subset of unlabeled training data to use in pretraining. As unlabeled training data sets can be quite large, selecting a smaller subset of data to use for pretraining allows for the benefits of using unlabeled, which is easier to obtain in large quantities, without the need to train over the entire set of unlabeled training data. In turn, the ASR model is pretrained on a smaller and more concentrated unlabeled training data set, resulting in a greater efficiency (i.e., greatly reduces computation in pretraining) than known ASR training methodologies. Further, using selected data produces an ASR that performs better for underrepresented data in the labeled training data set.

Figure 1:
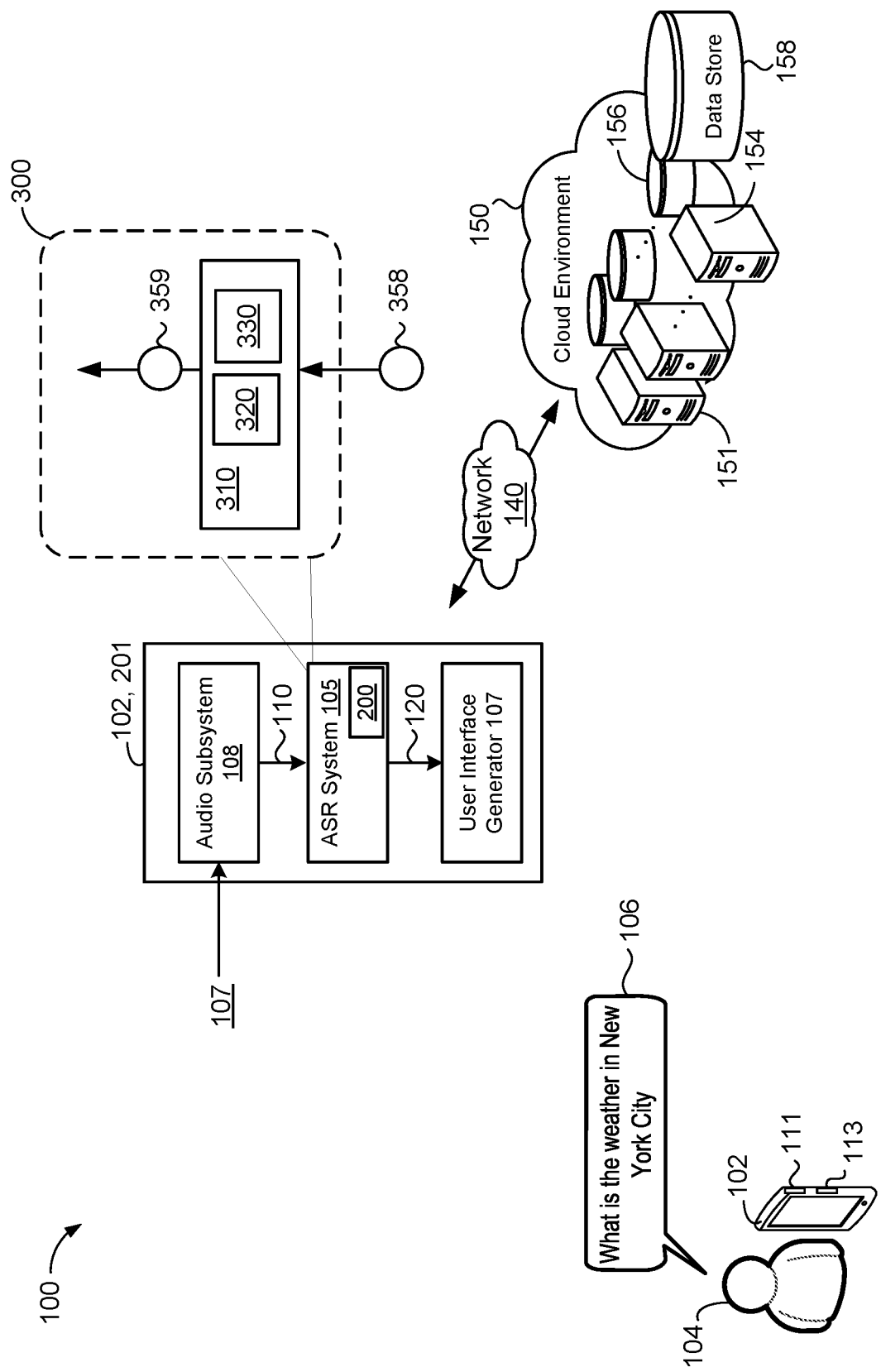
FIG. 1 is a schematic view of an example automatic speech recognition training and implementation system.

FIG. 1 illustrates a system 100 including an ASR system 105 implementing an ASR model 200 that resides on a user device 102 of a user 104 and/or on a remote system 150 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

In some implementations, the user device 102 is in communication with the remote system 150 (also referred to herein as a cloud computing environment) via a network 140. The remote system 150 may include scalable/elastic resources 151 including computing resources 154 (e.g., data processing hardware) and/or storage resources 156 (e.g., memory hardware). A data store 158 (i.e., a remote storage device) may be overlain on the storage resources 146 to allow scalable use of the storage resources 146 by one or more user devices 102 or the computing resources 154. The ASR system 105 may execute locally on the user device 102 (e.g., on the data processing hardware 111) or remotely (e.g., at the remote system 150).

The user device 102 includes an audio subsystem 108 configured to receive streaming audio 107 of an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 105. In the example shown, the user speaks a respective utterance 106 in a natural language of English for the phrase "What is the weather in New York City?" and the audio subsystem 108 converts the streaming audio 107 of the utterance 106 into corresponding acoustic frames 110 for input to the ASR system 105. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote system 150 also executes a user interface generator 107 configured to present a representation of the transcription 120 of the utterance 106 to the user 104 of the user device 102. In some configurations, the transcription 120 output from the ASR system 105 is processed, e.g., by a natural language understanding (NLU) module executing on the user device 102 or the remote system 150, to execute a user command. Additionally or alternatively, a text-to-speech system (e.g., executing on any combination of the user device 102 or the remote system 150) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Described in greater detail below, the ASR model 200 may be trained using a two-part training process 400 (FIG. 4) that includes a pre-training stage that uses unlabeled training data selected via a training data selection process 300. The training data selection process 300 leverages a contrastive data selection model 310, a quantizer 320 and a token based data selector 330 for selecting unlabeled training data for pre-training the ASR model 200. The training data selection process 300 uses the components 310, 320, and 330 to process a corpus of unlabeled training data 358 and select a subset of the unlabeled training data 359 (i.e., a subset of utterances 359) relevant to a target domain. The corpus of unlabeled training data 358 may be stored in a data store 158, for example. Though the quantizer 320 and token based data selector 330 are illustrated as being deployed in the contrastive data selection model 310, the components 310, 320, and 330 may be arranged in any suitable configuration to select a subset of unlabeled training data 359 related to a target domain from a large set of utterances 358 corresponding to a plurality of domains. Described in greater detail below with reference to FIG. 4, the training process 400 uses the subset of unlabeled training data 359 selected from the corpus of unlabeled training data 358 to pre-train the ASR model 200. In some implementations, the contrastive data selection model 310 implements self-supervised (or unsupervised) machine learning techniques to process the corpus of unlabeled training data 358 and select the subset of unlabeled training data 359.

The system of FIG. 1 is presented for illustrative purposes only and is not intended to be limiting. For example, although only a single example of each component is illustrated, any number of components 102, 150, 151, and 158 may be communicatively coupled to the system 100. Further, although some components are illustrated as being located in a cloud computing environment 150, in some implementations those components may be hosted locally on the user device 102. Alternatively, although some components are illustrated as being hosted on the user device 102, in some implementations those components can be hosted in a cloud computing environment 150. Further, in various implementations, some or all of the components 105, 108, and 107 are hosted locally on user device 102, remotely (such as in cloud computing environment 150), or some combination thereof.

Figure 2:
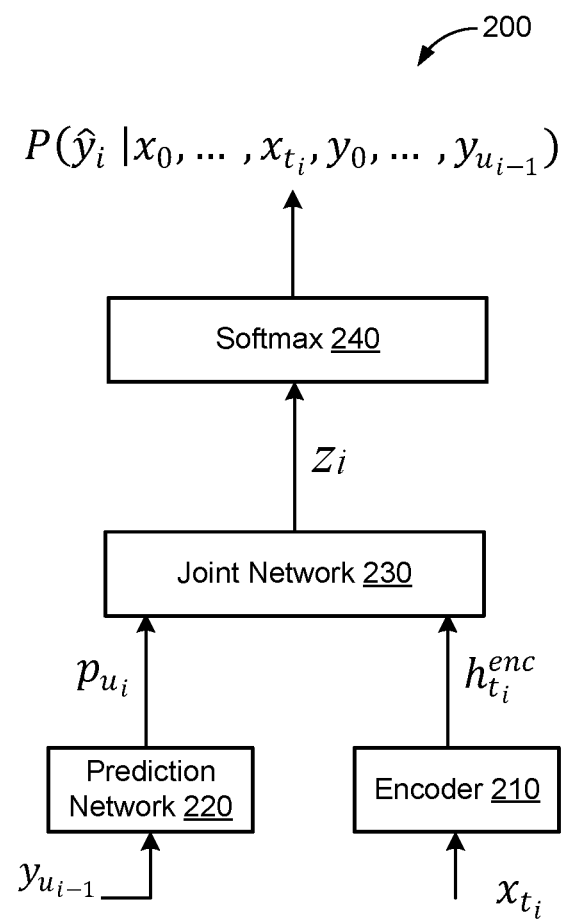
FIG. 2 is a schematic view of a Recurrent Neural Network-Transducer (RNN-T) model architecture.

Referring to FIG. 2, an example frame alignment-based transducer model 200 includes a Recurrent Neural Network-Transducer (RNN-T) model architecture which adheres to latency constrains associated with interactive applications. The use of the RNN-T model architecture is exemplary, and the frame alignment-based transducer model 200 may include other architectures such as transformer-transducer and conformer-transducer model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a stack of multi-head attention layers (e.g., Conformer or Transformer layers) or a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}^d$, and produces at each output step a higher-order feature representation. This higher-order feature representation is denoted as $h_1^{enc}, \ldots, h_T^{enc}$.

Similarly, the prediction network 220 may include LSTM network, which, like a language model (LM), processes the sequence of non-blank symbols output by a final Softmax layer 240 so far, $y_0, \ldots, y_{ui-1}$, into a dense representation $p_{u_i}$. Optionally, the prediction network 220 may include an embedding look-up table. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network (i.e., audio encoder) 210 of the RNN-T model 200 includes a stack of multi-head attention (e.g., self-attention) layers/blocks, such as conformer blocks or transformer blocks. Here, each conformer (or other type of multi-head attention block) block includes a series of multi-headed self attention, depth wise convolution and feed-forward layers. The prediction network 220 may have two 2,048-dimensional LSTM layers, each of which is also followed by 640-dimensional projection layer. Alternatively, the prediction network 220 may include a stack of transformer or conformer blocks, or an embedding look-up table in lieu of LSTM layers. Finally, the joint network 230 may also have 640 hidden units. The softmax layer 240 may be composed of a unified word piece or grapheme set that is generated using all unique word pieces or graphemes in a plurality of training data sets.

Figure 3A:
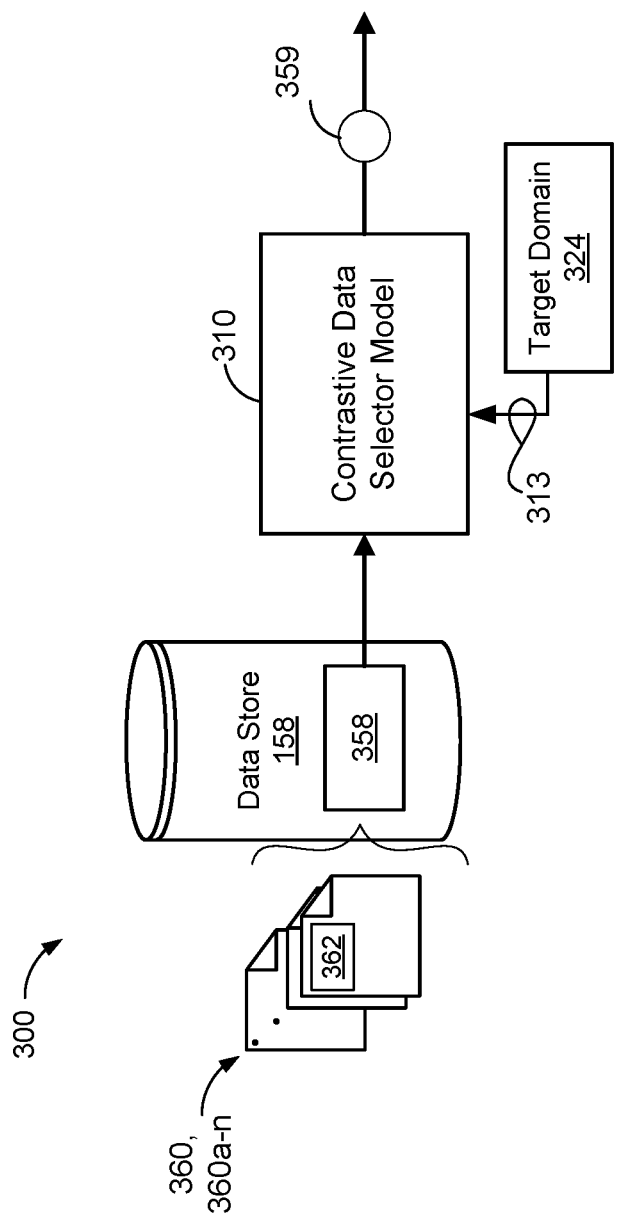
FIGS. 3A and 3B are schematic views of an example process for selecting data from a set of unlabeled training data for pre-training an automatic speech recognition model.

FIG. 3A illustrates a schematic view of an example training data selection process 300 for selecting data from the corpus of unlabeled training data 358 for pre-training an automatic speech recognition model 200. Here, the corpus of unlabeled training data 358 (stored in data store 158) may be fed to the contrastive data selector model 310 along with a domain identifier 313 indicating a target domain for which the ASR model 200 is being trained. The contrastive data selector model 310 may then select a subset of the unlabeled training data 359 corresponding to the target domain 324 from the corpus of unlabeled training data 358. For example, the corpus of unlabeled training data 358 may include a plurality of spoken utterances 360, 360a-n across multiple domains where each spoken utterance 360 includes corresponding unpaired audio data 362 characterizing the spoken utterance 360. As used herein, unpaired audio data 362 refers to audio data characterizing a spoken utterance 360 that is not paired with a corresponding transcription of the spoken utterance 360. Stated differently, the unpaired audio data 362 may be interchangeably referred to as un-transcribed audio data. The contrastive data selector model 310 may then process corresponding unpaired audio data 362 of each spoken utterance 360 from the corpus of unlabeled training data 358 (i.e., set of utterances 358) to select the spoken utterances 360 that correspond to the target domain for inclusion in the subset of unlabeled training data 359 (i.e., subset of spoken utterances 359).

The contrastive data selection process 300 may select the subset of unlabeled training data 359 for use in pre-training the ASR model 200 from the corpus of unlabeled training data 358, whereby the utterances 360 selected for inclusion in the subset of unlabeled training data 359 are most similar to the target domain 324 the ASR model 200 is being pre-trained to learn. That is, the process 300 is able to identify in-domain and near-domain utterances 360 from the corpus of unlabeled training data 358 for inclusion in the subset of unlabeled training data 359 for use in pre-training the ASR model 200. Notably, the spoken utterances 360 included in the subset of unlabeled training data 358 selected by the process 300 enables the synthesizing of distinct utterances on-the-fly during batch construction such that a new speaker embedding z and latent variable Z may be sampled for each spoken utterance 360 in a batch.

The corpus of unlabeled training data 358 includes unpaired audio data 362 characterizing a multitude of spoken utterances 360 from across a large range of domains, and includes a far greater linguistic diversity than the target domain 324 in which the ASR model 200 is being trained to learn. As mentioned previously, labeled training data may not provide coverage for all domains as it may be difficult to obtain labeled training data for underrepresented domains. By using unlabeled training data 358, and more specifically, by using a subset of unlabeled training data 359 corresponding to a target domain 324 selected from the corpus of unlabeled training data 358, the ASR model 200 can be more sufficiently trained to learn underrepresented domains. Further, by selecting the subset of the unlabeled training data 359 corresponding to the target domain from the large corpus of unlabeled training data 358, the ASR model 200 can be trained more efficiently than if it was trained on the entire corpus of unlabeled training data 358 that is inclusive of data spanning multiple domains different from the target domain the ASR model 200 is being trained to learn. The corpus of unlabeled training data 358 may dynamically change to incorporate new training data 358 the training data selection process 300 can select from.

The training data selection process 300 aims to improve the match between the audio-only utterances represented by the selected subset of unlabeled training data 359 and the target domain 324, which in turn reduces the computational resources required to exploit a large amount of non-domain-specific data. Accordingly, the training data selection process 300 reduces computational and memory costs by selecting the subset of unlabeled training data 359 including utterances that best match the target domain 324 the ASR model 200 is being trained to learn.

Figure 3B:
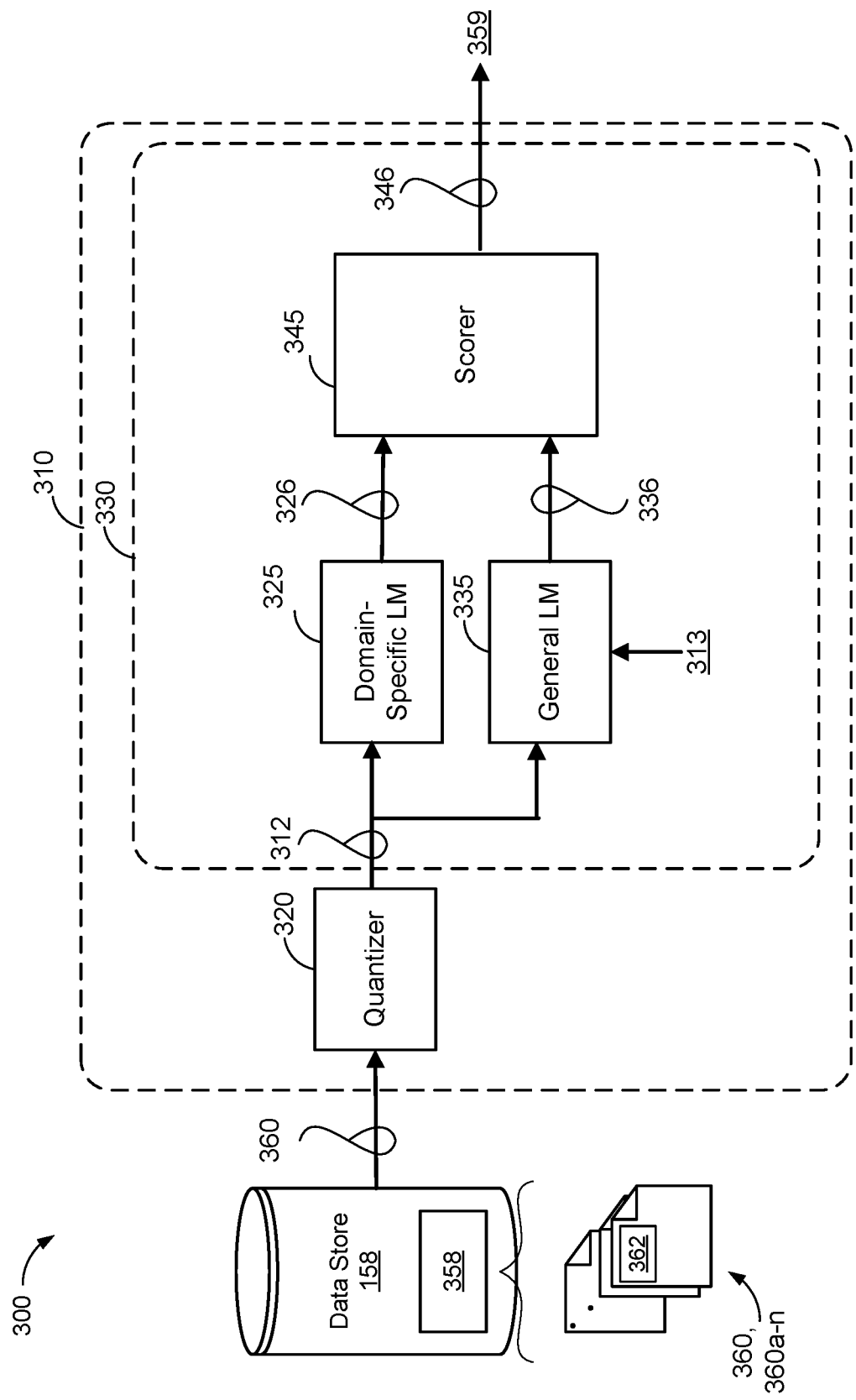

Referring to FIG. 3B, in some examples, the training data selection process 300 selects the subset of unlabeled training data 359 from the available corpus of unlabeled training data 358 that best match the target domain 324 by providing the domain identifier 313 associated with the target domain 324 as an input to a general language model (LM) 335 previously trained on a general corpus of utterances. As mentioned previously, the corpus of unlabeled training data 358 spans a multitude of different domains. In these examples, the general LM 335 may include a maximum entropy (MaxEnt LM) capable of optionally accepting the domain identifier 313 as input as described in U.S. Pat. No. 9,842,592, filed on Feb. 12, 2014, the contents of which is incorporated herein by reference in its entirety. Here, the domain identifier 313 associated with the target domain 324 may allow the MaxEnt LM to output the subset of unlabeled training data 359 selected from the corpus of unlabeled training data 358 that are likely to include those utterances 360 having words and/or phrases pertaining to the target domain 324. In some configurations, rather than evaluating likelihood of words, a statistical language model operates in reverse mode to randomly generate utterances that matches a statistical distribution of words pertaining to the target domain 324.

With continued reference to FIG. 3B, the training data selection process 300 implements the contrastive data selection model 310 along with a quantizer 320 and the token based data selector 330 to analyze the audio data 362 characterizing each utterance 360 from the set of unlabeled training data 358 to determine whether the utterance 360 corresponds to the target domain 324, whereby the process subsequently adds the utterance 360 to the subset of unlabeled training data 359 when the utterance 360 corresponds to the target domain 324. The training data selection process 350 begins by feeding the audio data 362 characterizing the spoken utterance 360 to the quantizer 320. The quantizer 320 may map the continuous features of the utterance (i.e., audio data 362) into a sequence of discrete tokens 312. The quantizer 320 may be placed at different depths of the ASR system 105. In some implementations, the quantizer 320 is deployed immediately after a feature encoder and before any transformer/conformer representation learning layers. In these implementations, the sequence of discrete tokens 312 is of low semantic level, and thus contains information like pitch, background noise, and other cofounding details conveyed by the audio data 362. In other implementations, the quantizer 320 is implemented at a top of all representation learning layers. In general, any suitable quantizer 320 and related configuration can be used to quantize the audio data 362 characterizing each utterance 360 into a corresponding sequence of discrete tokens 312.

A domain-specific LM 325 and the general LM 335 may each receive the corresponding sequence of discrete tokens 312 output from the quantizer 320 for each spoken utterance 360 to enable contrastive selection of the spoken utterances 360 for inclusion in the subset of unlabeled training data 359. Here, the domain-specific LM 325 is trained on corpora of the target domain 324. In other words, the domain-specific LM 325 is assumed to be trained on data belonging to the target domain 324 for which the ASR model 200 is being trained to learn. On the other hand, the general LM 335 is trained on corpora of the general domain (i.e., a plurality of domains). The plurality of domains spans a multitude of different domains. In some examples, the language models 325, 335 are trained using n-gram language model. In other examples, the language models 325, 335 are trained using neural network language model training.

The process uses the two LMs 325, 335 to evaluate each sequence of discrete tokens 312 by determining a first probability 326, $P_T$, associated with the sequence of discrete tokens 312 appearing in the target domain 324 (by the domain-specific LM 325) and determining a second probability 336, $P_G$, associated with the sequence of discrete tokens 312 appearing in the general domain. Thereafter, for each utterance 360 in the set of unlabeled training data 358, the process 300 determines, at a scorer 345, a domain relevance score (DRS) 346, based on the first probability 326, the second probability 336, and a corresponding vector quantized representation (i.e., the sequence of discrete tokens 312) of the utterance 360. For example, the DRS 346 for each utterance 360 may be calculated as follows.

$$DRS = \frac{\log P_T(q) - \log P_G(q)}{\text{length}(q)} \quad (1)$$

After determining the domain relevance scores 346, the process 300 selects the utterances 360 with the N-best scores 346 for inclusion in the subset of unlabeled training data 359. In some implementations, the scorer 345 compares the domain relevance score 346 of each utterance 360 to a threshold score, and selects the utterance 360 when the DRS 346 for the utterance 360 satisfies the threshold score. In other implementations, the threshold score is selected based on the distribution of domain relevance scores 346. The corpus of unlabeled training data 358 may include millions of utterances 360, while the subset of unlabeled training data 359 may be much smaller. However, the subset of unlabeled training data 359 pertaining to the target domain 325 may include a number of utterances 360 that is greater than a number of utterances present in available labeled training data for the target domain 324. By using unlabeled training data 358, specifically a subset of unlabeled training data 359 corresponding to the target domain 324, to pre-train the ASR model 200, the model 200 will provide better results for speech spoken in the target domain 324, even when the target domain 324 is underrepresented in the labeled training data conventionally used to train an ASR model 200. Notably, the unpaired audio data 362 characterizing the spoken utterances 360 selected for inclusion in the subset of unlabeled training data 359 by the training data selection process 300 may be used to pre-train the ASR model 200, while the labeled training data may be used to fine-tune the ASR model 200 via supervised learning. Pre-training the ASR model 200 may include pre-training an encoder (e.g., encoder 210 of FIG. 2) of the ASR model 200. As used herein, pre-training the ASR model 200 may include pre-training the encoder network 210 of the ASR model 200.

Figure 4:
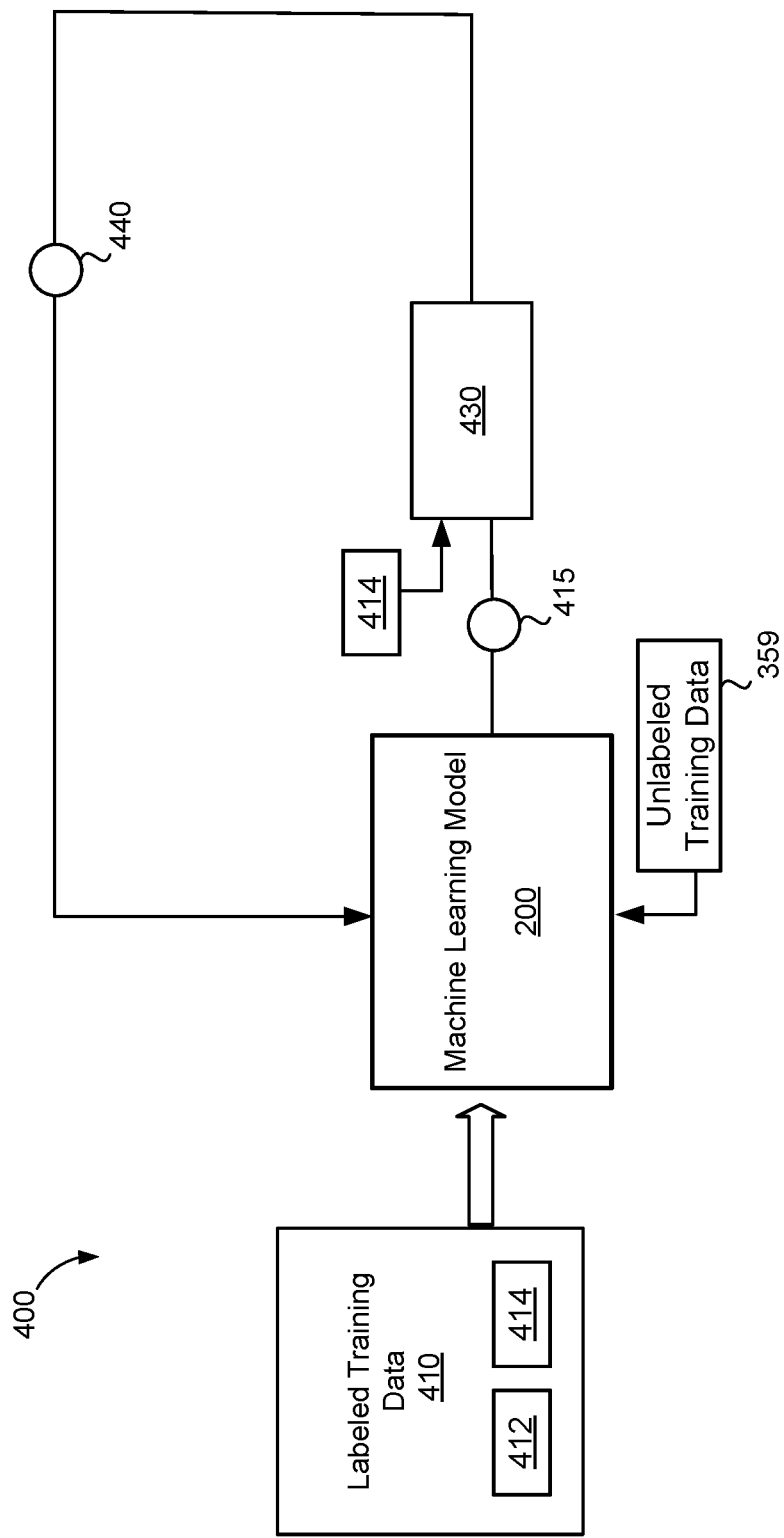
FIG. 4 is a schematic view of an example process for training an automatic speech recognition model using selected unlabeled training data and labeled training data.

FIG. 4 illustrates a training process 400 for training an ASR model 200. In some implementations, the process 400 employs a two-step training technique including pre-training and training. Pre-training a model is a technique used for initializing a model which can then be further fine-tuned based on labeled training data 410. For the ASR model 200, pre-training may include initiating the ASR model 200 with selected unlabeled training data 359 including unpaired audio data 362 characterizing a plurality of spoken utterances 360 by one or more speakers. As described above (FIG. 3A), the unlabeled training data 359 may include a plurality of utterances that correspond to a target domain 324, where the unlabeled training data 359 is a subset of utterances 360 selected from a larger corpus of utterances spanning multiple different domains. The unlabeled training data 359 used for pre-training may be speech synthesized from reference transcripts in a predetermined voice and/or non-synthetic speech samples spoken by real humans. In some implementations, pre-training the model 200 may include implementing one or more self-supervised training techniques which learn from unlabeled training data.

The process 400, after pre-training is complete, may fine-tune parameters of the pre-trained ASR model 200. The training process 400 includes training, for example, an encoder and/or decoder of the ASR model 200 separately or jointly in any suitable combination. Here, the encoder 210 may be pre-trained on the subset of unlabeled training data 359, and then the pre-trained encoder 210 is fine-tuned together with the decoder (e.g., prediction and joint networks 230) on a labeled training input. The process 400 includes feeding the labeled training input 410 to the ASR model 200. In some implementations, the labeled training input 410 includes a plurality of utterances 412 corresponding to audio of speech samples spoken by a variety of different speakers. Here, the plurality of utterances 412 may be different from the utterances 360 of the unlabeled training data 358 used to pre-train the model 200. Further, each labeled training input 410 may be paired with a corresponding label 414 indicating a target output associated with a respective utterance 412. For example, the label 414 may be a ground-truth transcription corresponding to the respective utterance 412. Upon receiving the labeled training input 410, the ASR model 200 may generate an output 415 (e.g., a transcription 120). The ASR model 200 may process the labeled training input 410 in any suitable manner for speech recognition.

In some implementations, a loss function 430 compares the output 415 and the label 414 to generate a supervised loss term 440 that indicates a discrepancy between the label 414 (i.e., the target output) and the output 415 (i.e., the predicted output). The loss function 430 may implement any suitable technique to determine a loss such as regression loss, mean squared error, mean squared logarithmic error, mean absolute error, binary classification, binary cross entropy, hinge loss, multi-class loss, etc. The training process may apply the supervised loss term 440 to the ASR model 200 via back propagation to update the parameters of the ASR model 200. Here, techniques such as stochastic gradient descent back propagate the supervised loss term 440 to adjust one or more parameters of the ASR model 200. In some implementations, when the ASR model 200 is suitably trained, the model is frozen. In other words, the parameters remain unchanged for a period of time until it is deemed that the ASR model 200 needs to be retrained (e.g., when sufficient new labeled training data 410 is obtained) or replaced.

Figure 5:
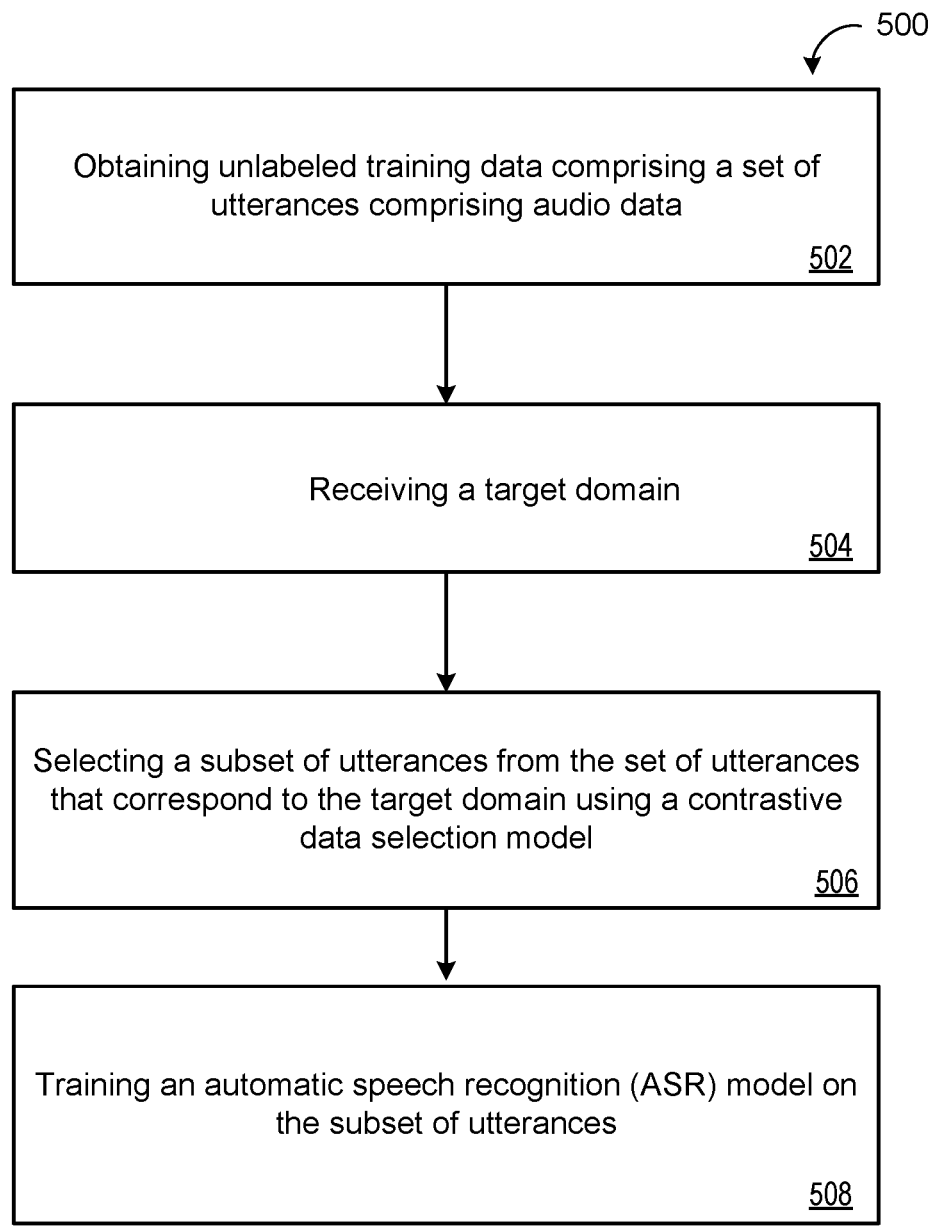
FIG. 5 is a flowchart of an example arrangement of operations for a method of pre-training an automatic speech recognition model using selected training data.
Figure 6:
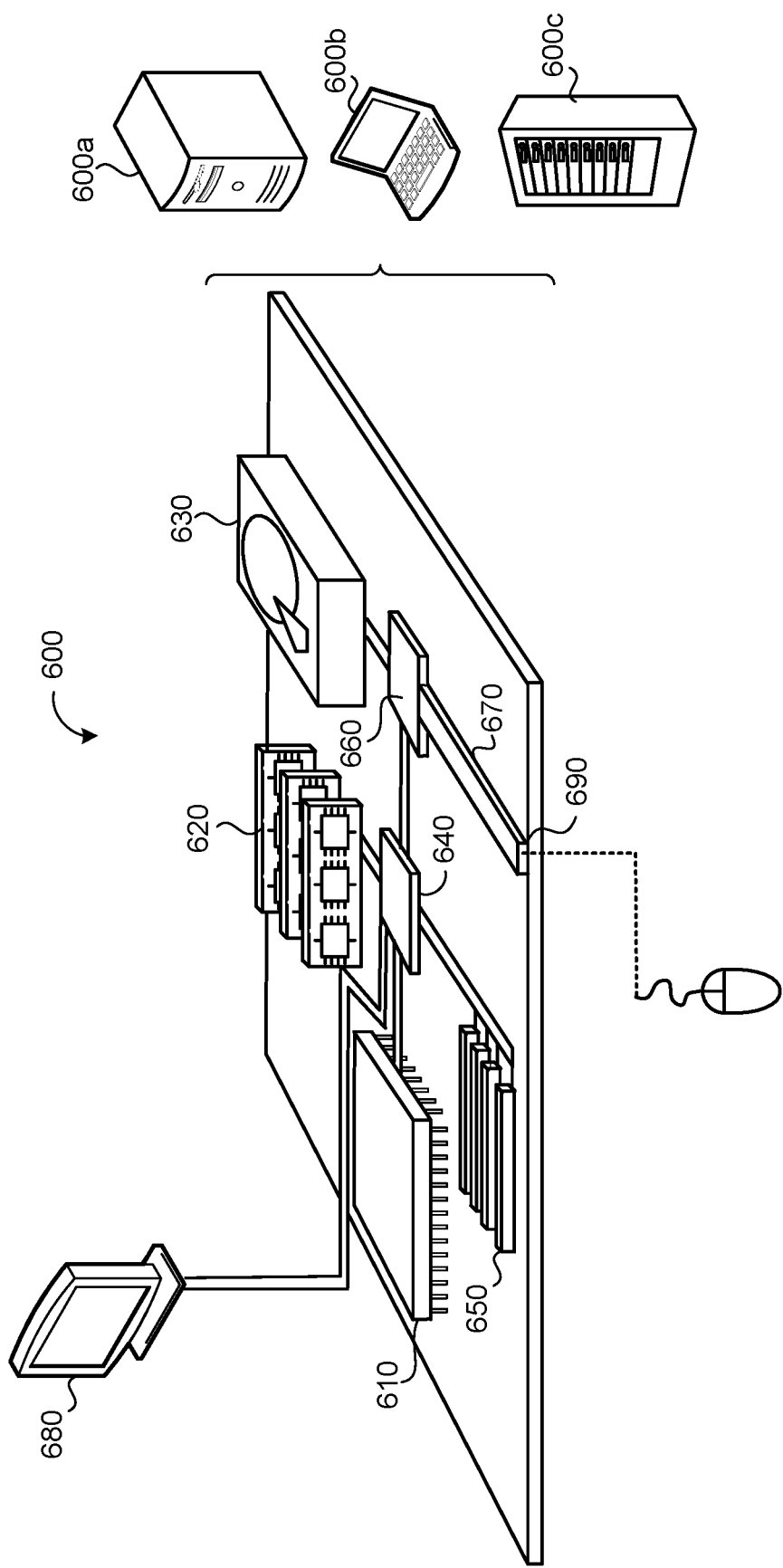
FIG. 6 is a schematic view of an example computing device that may be used to implement the systems and methods described herein.

FIG. 5 is a flowchart of an exemplary arrangement of operations for a method 500 of pre-training an automatic speech recognition model 200 using selected unlabeled training data 359. The method 500 may execute on data processing hardware 610 (FIG. 6) using instructions stored on memory hardware 620 (FIG. 6). The data processing hardware 610 and the memory hardware 620 may reside on the remote system 150 of FIG. 1 corresponding to a computing device 600 (FIG. 6).

At operation 502, the method 500 includes obtaining a corpus of unlabeled training data 358 including multiple spoken utterances 360 that each include corresponding audio data 362 characterizing the utterance 360. At operation 504, the method 500 also includes receiving a target domain 324. At operation 506, the method 500 includes selecting, using a contrastive data selection model 310, a subset of the spoken utterances 360 from the corpus of unlabeled training data 358 that correspond to the target domain 324. At operation 508, the method 500 includes training an automatic speech recognition (ASR) model 200 on the subset of utterances 359.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   obtaining a corpus of unlabeled training data comprising a first set of spoken utterances, each corresponding spoken utterance in the first set of spoken utterances comprises audio data characterizing the corresponding spoken utterance;
   receiving a target domain;
   selecting, using a contrastive data selection model, a subset of the spoken utterances from the corpus of unlabeled training data that correspond to the target domain; and
   training an automatic speech recognition (ASR) model on the subset of spoken utterances selected from the corpus of unlabeled training data that correspond to the target domain,
   wherein selecting the subset of the spoken utterances comprises, for each corresponding spoken utterance in the corpus of unlabeled training data:

quantizing the audio data characterizing the spoken utterance to produce a corresponding sequence of discrete tokens;

generating a domain relevance score based on the corresponding sequence of discrete tokens; and determining to select or omit selection of the corresponding spoken utterance based on the domain relevance score.

2. The computer-implemented method of claim 1, wherein training the ASR model comprises training the ASR model on the subset of spoken utterances using a self-supervised training technique.

3. The computer-implemented method of claim 1, wherein the selected subset of spoken utterances comprises a fewer number spoken utterances than a number of spoken utterances in the corpus of unlabeled training data.

4. The computer-implemented method of claim 1, wherein the operations further comprise refining the ASR model by training the ASR model on labeled training data, the labeled training data comprising:
a second set of spoken utterances; and
a respective ground-truth transcription paired with each spoken utterance in the second set of spoken utterances.

5. The computer-implemented method of claim 1, wherein generating the domain relevance score further comprises:
processing, using a first language model, the corresponding sequence of discrete tokens of the corresponding spoken utterance to generate a first output, the first language model trained on target training data corresponding to the target domain;
processing, using a second language model, the respective sequence of discrete tokens of the utterance to generate a second output, the second language model trained on general training data corresponding to a plurality of domains; and
comparing the first output to the second output to determine the domain relevance score.

6. The computer-implemented method of claim 5, wherein domain relevance score is based on a difference between the first output and the second output divided by a number of tokens in the corresponding sequence of discrete tokens of the corresponding spoken utterance.

7. The computer-implemented method of claim 5, wherein the first language model and the second language model comprise N-gram language models.

8. The computer-implemented method of claim 1, wherein quantizing the spoken utterance comprises mapping one or more continuous features of the audio data characterizing the spoken utterance into the sequence of discrete tokens.

9. The computer-implemented method of claim 1, wherein the contrastive data selection model comprises a self-supervised learning model.

10. A system comprising:
data processing hardware; and
memory hardware in communication with the data processing hardware, the memory hardware storing instructions that when executed on the data processing hardware cause the data processing hardware to perform operations comprising:
obtaining a corpus of unlabeled training data comprising a first set of spoken utterances, each corresponding spoken utterance in the first set of spoken utterances comprises audio data characterizing the corresponding spoken utterance;
receiving a target domain;
selecting, using a contrastive data selection model, a subset of the spoken utterances from the corpus of unlabeled training data that correspond to the target domain; and
training an automatic speech recognition (ASR) model on the subset of spoken utterances selected from the corpus of unlabeled training data that correspond to the target domain,
wherein selecting the subset of the spoken utterances comprises, for each corresponding spoken utterance in the corpus of unlabeled training data:
quantizing the audio data characterizing the spoken utterance to produce a corresponding sequence of discrete tokens;
generating a domain relevance score based on the corresponding sequence of discrete tokens; and
determining to select or omit selection of the corresponding spoken utterance based on the domain relevance score.

11. The system of claim 10, wherein training the ASR model comprises training the ASR model on the subset of spoken utterances using a self-supervised training technique.

12. The system of claim 10, wherein the selected subset of spoken utterances comprises a fewer number spoken utterances than a number of spoken utterances in the corpus of unlabeled training data.

13. The system of claim 10, wherein the operations further comprise refining the ASR model by training the ASR model on labeled training data, the labeled training data comprising:
a second set of spoken utterances; and
a respective ground-truth transcription paired with each spoken utterance in the second set of spoken utterances.

14. The system of claim 10, wherein generating the domain relevance score further comprises:
processing, using a first language model, the corresponding sequence of discrete tokens of the corresponding spoken utterance to generate a first output, the first language model trained on target training data corresponding to the target domain;
processing, using a second language model, the respective sequence of discrete tokens of the utterance to generate a second output, the second language model trained on general training data corresponding to a plurality of domains; and
comparing the first output to the second output to determine the domain relevance score.

15. The system of claim 14, wherein domain relevance score is based on a difference between the first output and the second output divided by a number of tokens in the corresponding sequence of discrete tokens of the corresponding spoken utterance.

16. The system of claim 14, wherein the first language model and the second language model comprise N-gram language models.

17. The system of claim 10, wherein quantizing the spoken utterance comprises mapping one or more continuous features of the audio data characterizing the spoken utterance into the sequence of discrete tokens.

18. The system of claim 10, wherein the contrastive data selection model comprises a self-supervised learning model.

* * * * *